(12) United States Patent
Denton et al.

(10) Patent No.: US 8,192,293 B2
(45) Date of Patent: Jun. 5, 2012

(54) METHOD AND SYSTEM FOR SHOT TRACKING

(75) Inventors: Scott Denton, Carlsbad, CA (US); Joseph Balardeta, Encinitas, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 13/007,266

(22) Filed: Jan. 14, 2011

(65) Prior Publication Data

US 2011/0224011 A1  Sep. 15, 2011

Related U.S. Application Data

(63) Continuation of application No. 12/838,656, filed on Jul. 19, 2010, which is a continuation-in-part of application No. 12/720,369, filed on Mar. 9, 2010, now Pat. No. 7,942,762, and a continuation of application No. 12/779,653, filed on May 13, 2010.

(51) Int. Cl.
*A63F 9/24* (2006.01)
*G06F 17/00* (2006.01)

(52) U.S. Cl. ........ 473/155; 473/297; 473/407; 473/222; 473/286; 340/568.6; 340/539.13; 702/19; 463/36; 700/92

(58) Field of Classification Search .................. 437/407
See application file for complete search history.

(56) References Cited

U.S. PATENT DOCUMENTS

| | | |
|---|---|---|
| 3,898,437 A | 8/1975 | Butler |
| 4,367,526 A | 1/1983 | McGeary et al. |
| 4,419,655 A | 12/1983 | May |
| 4,764,666 A | 8/1988 | Bergeron |
| 4,910,677 A | 3/1990 | Remedio et al. |
| 5,043,889 A | 8/1991 | Lucey |
| 5,056,783 A * | 10/1991 | Matcovich et al. ........... 473/453 |
| 5,095,430 A | 3/1992 | Bonito et al. |
| 5,127,044 A | 6/1992 | Bonito et al. |
| 5,214,757 A | 5/1993 | Mauney et al. |
| 5,245,537 A | 9/1993 | Barber |
| 5,261,820 A | 11/1993 | Slye et al. |
| 5,271,034 A | 12/1993 | Abaunza |
| 5,319,548 A | 6/1994 | Germain |
| 5,326,095 A | 7/1994 | Dudley |
| 5,364,093 A | 11/1994 | Huston et al. |
| 5,434,789 A | 7/1995 | Fraker et al. |
| 5,438,518 A | 8/1995 | Bianco et al. |
| 5,469,175 A | 11/1995 | Boman |
| 5,507,485 A | 4/1996 | Fisher |
| 5,524,081 A | 6/1996 | Paul |
| 5,528,248 A | 6/1996 | Steiner et al. |
| 5,528,518 A | 6/1996 | Bradshaw et al. |
| 5,558,333 A | 9/1996 | Kelson et al. |
| 5,664,880 A | 9/1997 | Johnson et al. |
| 5,685,786 A | 11/1997 | Dudley |
| 5,689,431 A | 11/1997 | Rudow et al. |
| 5,699,244 A | 12/1997 | Clark, Jr. et al. |

(Continued)

*Primary Examiner* — Paul A D'Agostino

(74) *Attorney, Agent, or Firm* — Sonia Lari; Michael A. Catania; Rebecca Hanovice

(57) ABSTRACT

A method for predicting a golfer's swing speed, wherein the method comprises determining that the golfer is addressing a golf ball to swing a golf club, monitoring a backswing, determining a transition time, monitoring a downswing, determining an impact time, transmitting data for the golfer's swing to a receiver for analysis and generating a golfer's swing speed using a length of a shaft of the golf club.

14 Claims, 6 Drawing Sheets

U.S. PATENT DOCUMENTS

| | | | |
|---|---|---|---|
| 5,740,077 A | 4/1998 | Reeves | |
| 5,772,534 A | 6/1998 | Dudley | |
| 5,779,566 A | 7/1998 | Wilens | |
| 5,797,809 A | 8/1998 | Hyuga | |
| 5,802,492 A | 9/1998 | DeLorme et al. | |
| 5,810,680 A | 9/1998 | Lobb et al. | |
| 5,835,896 A | 11/1998 | Fisher et al. | |
| 5,873,797 A | 2/1999 | Garn | |
| 5,878,369 A | 3/1999 | Rudow et al. | |
| 5,882,269 A | 3/1999 | Lewis | |
| 5,904,727 A | 5/1999 | Prabhakaran | |
| 5,949,679 A | 9/1999 | Born et al. | |
| 6,029,121 A | 2/2000 | Stashko | |
| 6,062,991 A | 5/2000 | Moriarty et al. | |
| 6,111,541 A | 8/2000 | Karmel | |
| 6,171,199 B1 | 1/2001 | Cohodas et al. | |
| 6,224,493 B1 | 5/2001 | Lee et al. | |
| 6,263,279 B1 | 7/2001 | Bianco et al. | |
| 6,402,634 B2 | 6/2002 | Lee et al. | |
| 6,431,990 B1 | 8/2002 | Manwaring | |
| 6,441,745 B1 * | 8/2002 | Gates | 340/669 |
| 6,456,938 B1 | 9/2002 | Barnard | |
| 6,638,175 B2 | 10/2003 | Lee et al. | |
| 6,821,209 B2 | 11/2004 | Manwaring et al. | |
| 7,163,468 B2 | 1/2007 | Gibbs et al. | |
| 7,163,470 B2 | 1/2007 | Galloway et al. | |
| 7,166,038 B2 | 1/2007 | Williams et al. | |
| 7,214,143 B2 | 5/2007 | Deshmukh | |
| 7,252,600 B2 | 8/2007 | Murphy et al. | |
| 7,258,626 B2 | 8/2007 | Gibbs et al. | |
| 7,258,631 B2 | 8/2007 | Galloway et al. | |
| 7,273,419 B2 | 9/2007 | Evans et al. | |
| 2005/0215340 A1 * | 9/2005 | Stites et al. | 473/233 |
| 2006/0052173 A1 * | 3/2006 | Telford | 473/131 |
| 2006/0084516 A1 * | 4/2006 | Eyestone et al. | 473/219 |
| 2009/0075761 A1 | 3/2009 | Balardeta et al. | |
| 2010/0267462 A1 * | 10/2010 | Mooney | 473/269 |
| 2011/0237344 A1 * | 9/2011 | Nusbaum et al. | 473/278 |

* cited by examiner

METHOD AND SYSTEM FOR SHOT TRACKING

CROSS REFERENCES TO RELATED APPLICATIONS

The present application is a continuation in part of U.S. patent application Ser. No. 12/720,369 filed on Mar. 9, 2010, U.S. patent application Ser. No. 12/779,653 filed on May 13, 2010 and U.S. patent application Ser. No. 12/838,656 filed on Jul. 19, 2010.

STATEMENT REGARDING FEDERALLY SPONSORED RESEARCH OR DEVELOPMENT

Not Applicable

BACKGROUND OF THE INVENTION

1. Field of the Invention

The present invention relates to shot tracking. More specifically, the present invention relates to a method and system for tracking shots of a golfer during a round of golf.

2. Description of the Related Art

Golf clubs combine with the players swing to propel a ball toward a favored location and through a favored path. The orientation and speed of the club head at impact largely determines the ball path including carry distance and roll.

The prior art is lacking in a method and system to measure the motion of the club through measurement of the shaft.

BRIEF SUMMARY OF THE INVENTION

The present invention is novel in that the observation of the relative motion does not depend on near visible light and uses a coherent pattern to capture the position of the club relative the ground antenna transmitter/receiver. This fixed device also includes a display, computing capability and recording device. This information, when processed, enables the display of the swing and uses data on the club head and ball to calculate the flight of the ball.

This invention is a method for predicting a golfer's swing speed. The method comprises determining that a golfer is addressing a golf ball to swing a golf club, wherein the golf club comprises a device comprising an accelerometer and a radiofrequency transceiver, The method further comprises monitoring a backswing of the golfer, determining an impact time of the golf club with the golf ball and transmitting data for the golfer's swing to a receiver for analysis. The data comprises the transition time and the impact time. Further, the method comprises generating a golfer's swing speed using a length of a shaft of the golf club, the transition time and the impact time.

The invention further comprises a system for predicting a golfer's swing speed. The system comprises a golf club comprising a head, a shaft, a grip and a device attached to the grip. The device comprises a microprocessor, an accelerometer and a radiofrequency transceiver. The microprocessor is configured to determine that a golfer is addressing a golf ball to swing a golf club, monitor a backswing f the golfer, determine a transition time from a backswing to a downswing of the golfer, monitor the downswing of the golfer, determine an impact time of the golf club with the golf ball and transmit date for the golfer's swing. The data comprises the transition time and the impact time. The system further comprises a receiver comprising a microprocessor and a transceiver wherein the transceiver operates on the first communication protocol and the microprocessor is configured to generate a golfer's swing speed using a length of a shaft of the golf club, the transition time and the impact time.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
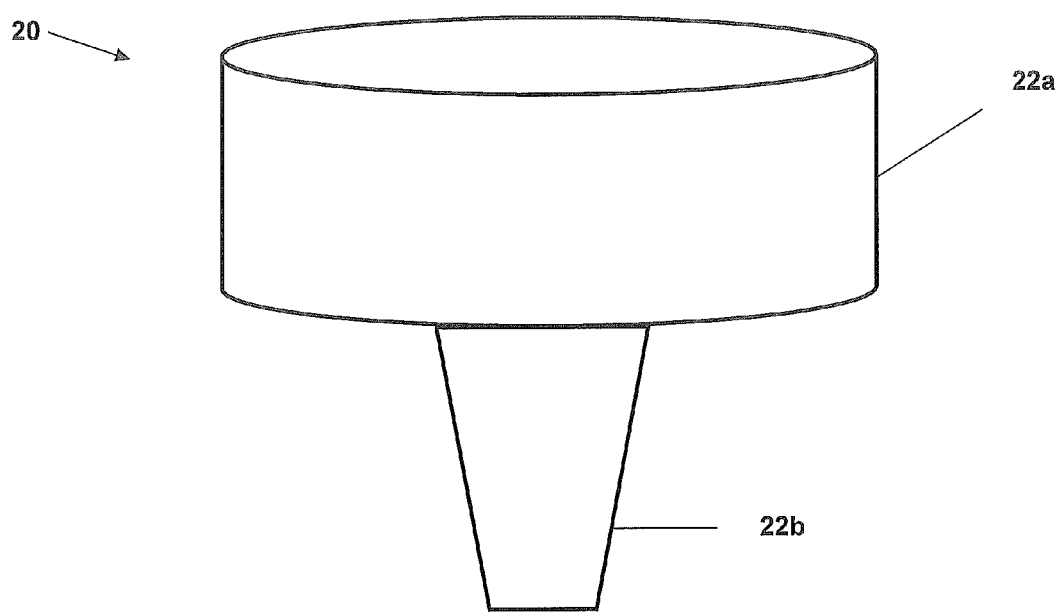
FIG. 1 is a perspective view of the device for shot tracking.

FIG. 1 is a perspective view of the device for shot tracking.

Figure 2:
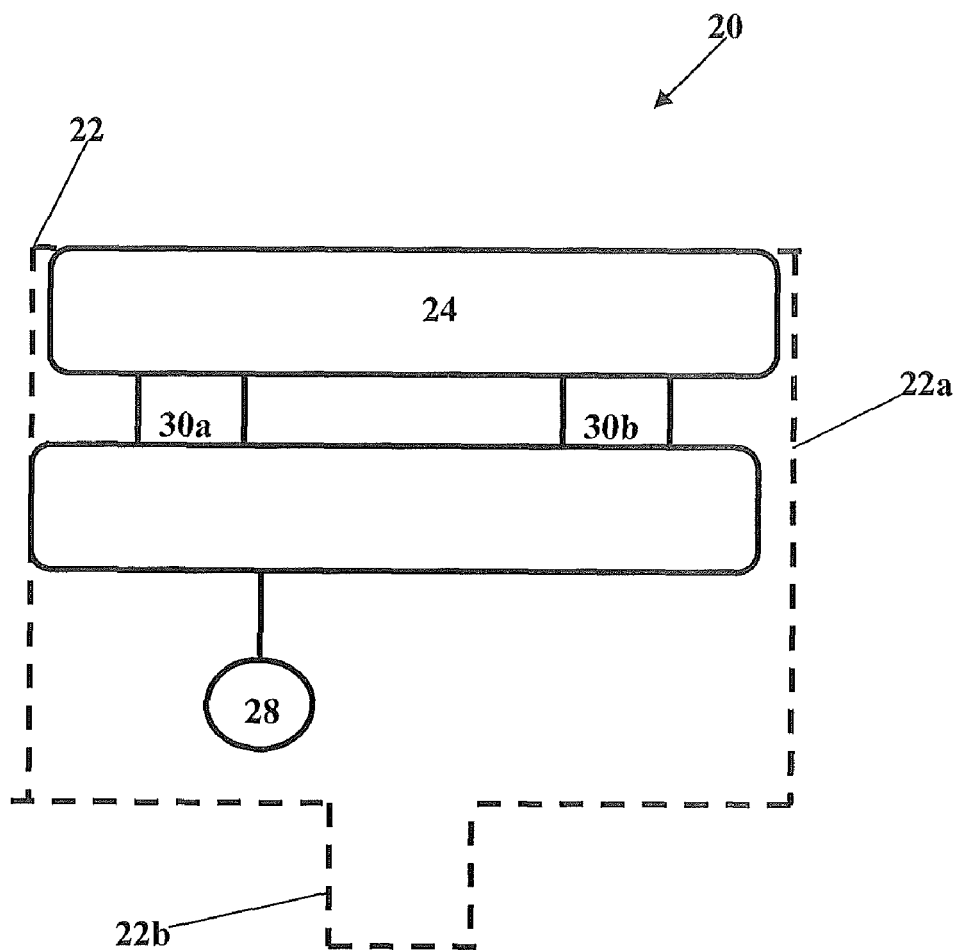
FIG. 2 is a perspective view of components of a device for shot tracking, including the main body and projection body extending downward.

FIG. 2 is a perspective view of components of a device for shot tracking, including the main body and projection body extending downward.

Figure 3:
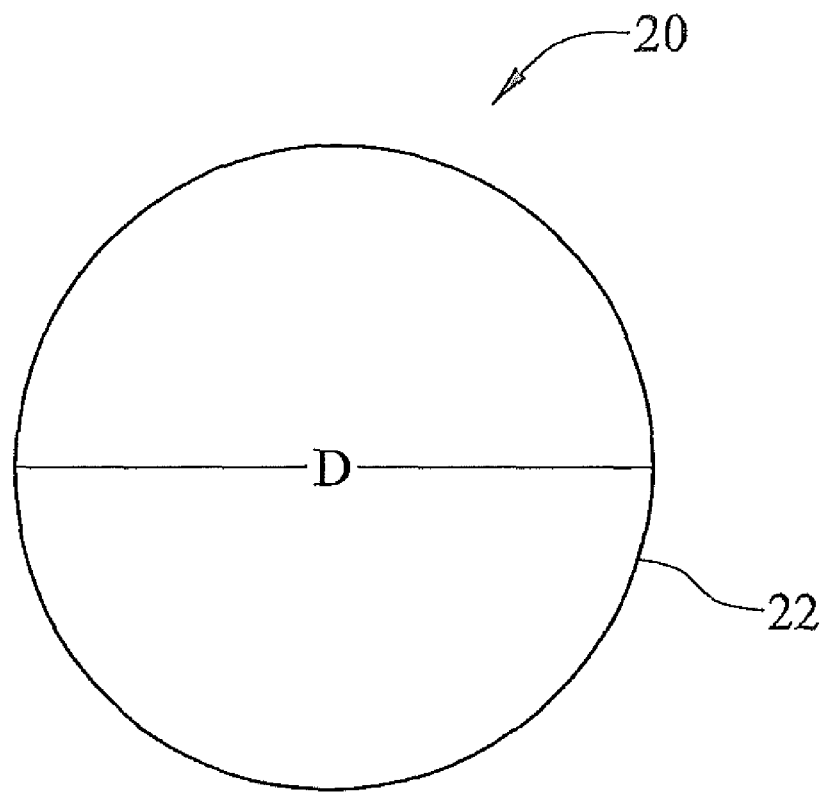
FIG. 3 shows the housing component of the shot tracking device and illustrates the diameter

FIG. 3 shows the housing component of the shot tracking device and illustrates the diameter.

Figure 4:
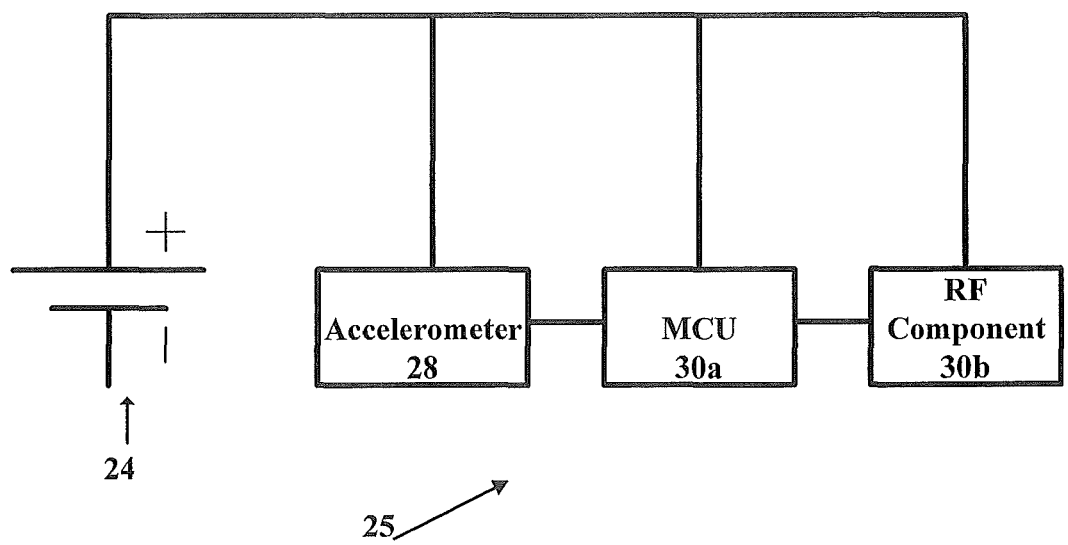
FIG. 4 is an illustration of the circuit diagram of the components of a device for shot tracking.

FIG. 4 is an illustration of the circuit diagram of the components of a device for shot tracking.

Figure 5:
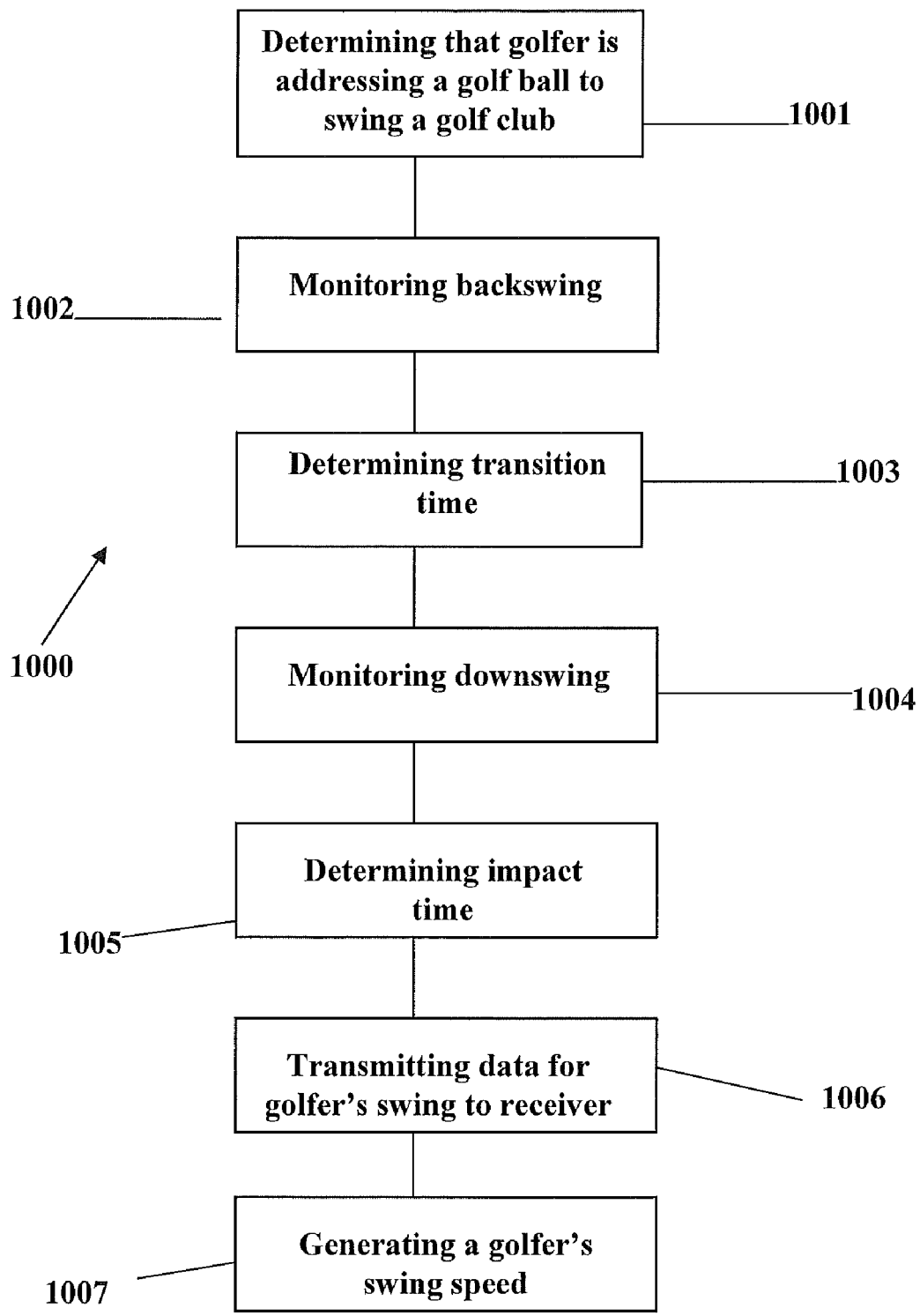
FIG. 5 is a flow chart of a method of shot tracking.

FIG. 5 is a flow chart of a method of shot tracking.

Figure 6:
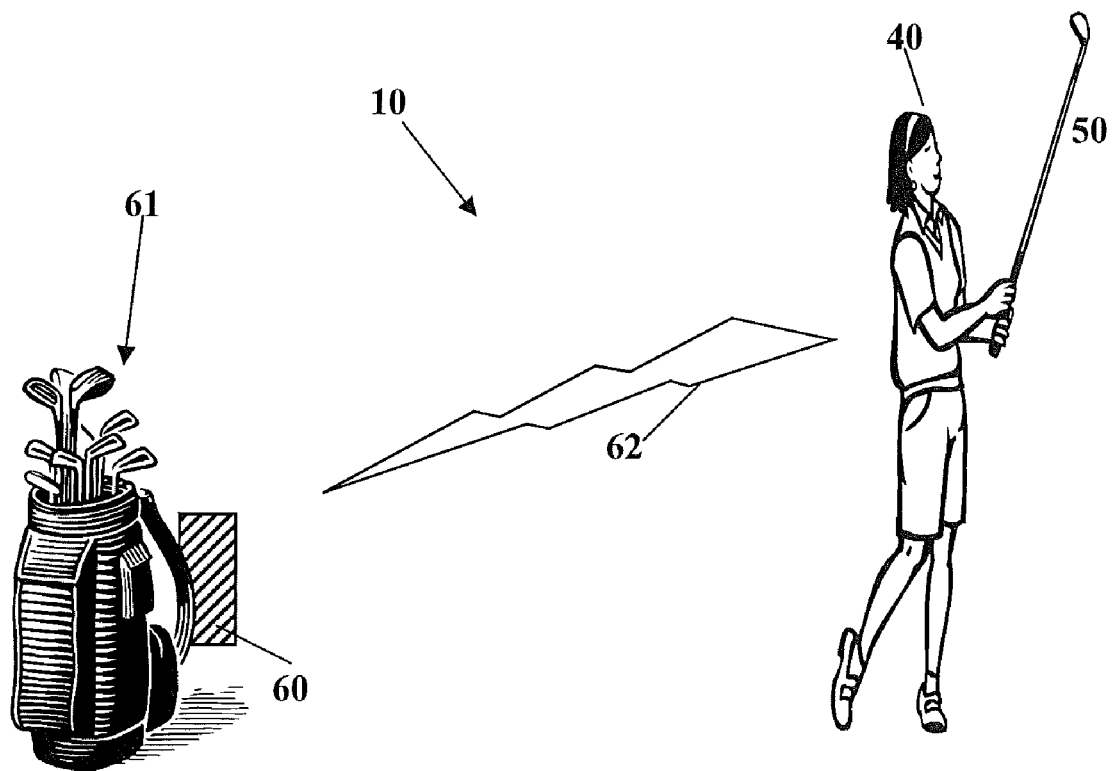
FIG. 6 is an illustration of a system for shot tracking.

FIG. 6 illustrates the system 20. A transponder in a golf club 50 swung by a golfer sends a signal 62 to a receiver 60. The receiver is attached to a golf bag 61, however, those skilled within the pertinent art will recognize that the receiver may be attached to any pertinent device including the golfer, or may stand alone.

This invention is a method 1000 for predicting a golfer's swing speed. The method 1000 comprises determining that a golfer is addressing a golf ball to swing a golf club 50, wherein the golf club 50 comprises a device comprising an accelerometer 28 and a radiofrequency transceiver 1001. The method further comprises monitoring a backswing of the golfer 1002, determining an impact time of the golf club 50 with the golf ball 10055 and transmitting data for the golfer's 40 swing to a receiver for analysis 1006. The data comprises the transition time and the impact time. Further, the method comprises generating a golfer's swing speed using a length of a shaft of the golf club, the transition time and the impact time 1007.

Preferably, the method 1000 comprises transmitting the data on the golfer's swing in a single transmission. Alternatively, the data comprising the golfer's 40 swing is transmitted in a plurality of transmission. The data for the golfer's 40 swing is preferably transmitted at a radiofrequency of 2.4 gigaHertz utilizing the radiofrequency transceiver of the device 10. The device 10 may further comprise a microprocessor 30a and a battery 24. Preferably, the accelerometer 28 of the device is a multi-axis accelerometer. The monitoring of the backswing and downswing is preferably at a rate of 1 kilo-Hertz or alternatively at a rate of 5 kilo-Hertz. A preferred receiver is a GPS device 60, a Smart Phone, PDA, or computer.

The method 1000 further comprises transmitting data comprising data on the golfer's 40 swing in a single transmission. The method may also comprise transmitting data in a plurality of transmissions. The data for a golfer's 40 swing is preferably transmitted at a radiofrequency of 2.5 gigaHertz utilizing the radiofrequency transceiver 30b of the device 10. The method 1000 may comprise wherein the monitoring of the backswing and the monitoring of the downswing occur at a rate of at least 1 kilo-Hertz or alternatively at a rate of 5 kilo-Hertz. The receiver 60 is preferably a GPS device or alternatively may be a Smart Phone, PDA, or computer. The device 10 preferably comprises a battery 24 and a microprocessor 30a and the accelerometer 28 is preferably a multiple axis accelerometer.

The invention further comprises a system 10 for predicting a golfer's 40 swing speed as shown in FIG. 6. The system 10 comprises a golf club 50 comprising a head, a shaft, a grip and a device 10 attached to the grip. The device 10 comprises a microprocessor 30a, an accelerometer 28 and a radiofrequency transceiver 30b. The microprocessor 30a is configured to determine that a golfer 40 is addressing a golf ball to swing a golf club 50, monitor a backswing f the golfer 40, determine a transition time from a backswing to a downswing of the golfer 40, monitor the downswing of the golfer 40, determine an impact time of the golf club 50 with the golf ball and transmit date for the golfer's 40 swing. The data comprises the transition time and the impact time. The system 10 further comprises a receiver comprising a microprocessor and a transceiver wherein the transceiver operates on the first communication protocol and the microprocessor 30b is configured to generate a golfer's 40 swing speed using a length of a shaft of the golf club 50, the transition time and the impact time.

Preferably, the microprocessor 30b is configured to transmit fate on the golfer's 40 swing in a single transmission. Alternatively, the microprocessor 30b is configured to transmit the data in a plurality of transmission. The microprocessor 30b is preferably configured to monitor the backswing and monitor the downswing at a rate of at least 1 kilo-Hertz or alternatively at a rate of at least 5 kilo-Hertz. The data for the golfer's 40 swing is transmitted at a radiofrequency of 2.4 gigaHertz utilizing the radiofrequency transceiver 30b of the device 10. The device 10 may further comprise a microprocessor 30a, battery 24 and a multiple axis accelerometer 28. The receiver 60 of the system 10 is preferably a GPS device or alternatively a Smart Phone, PDA, or computer.

In an alternative embodiment, the data of the golfer's swing is transmitted from a device 20 comprising a housing 22 composed of a polymer material, wherein the housing has a main body 22a and a projection body 22b extending from the main body 22a as shown in FIGS. 1-2. The projection body 22b has a length ranging from 1 mm to 5 mm and a diameter ranging from 20 mm to 25 mm as shown in FIG. 3. As shown in FIG. 4, a battery 24 is positioned within the housing 22 and a microprocessor 30a is positioned within the housing 22, wherein the microprocessor 30a is in electrical communication with the battery 24. The device 20 further comprises a multi-axis accelerometer 28 for determining movement, monitoring movement and communicating the movement to the microprocessor, wherein the multi-axis accelerometer 28 positioned within the housing 22. The multi-axis accelerometer 28 is in electrical communication with the microprocessor 30a. A radiofrequency component 30b is positioned within the housing 22, wherein the radiofrequency component 30b in electrical communication with the microprocessor 30a. The radiofrequency component 30b operates at 2.4 giga-Hertz, and the radiofrequency component 30b transmits a signal 62 comprising data related to the movement monitored by the multi-axis accelerometer 28.

The battery 24 is preferably a CR1620 having at least 75 milliamps of power. The receiver is preferably a GPS device 60 such as disclosed in Balardeta et al., U.S. Patent Publication Number 20090075761 for a Golf GPS Device And System, which is hereby incorporated by reference in its entirety. Alternatively, the receiver is a personal digital assistant (PDA), "smart phone", mobile phone, or other similar device. However, those skilled in the pertinent art will recognize that the receiver may be any device capable of receiving and storing signals from the RFID tag.

Gibbs, et al., U.S. Pat. No. 7,163,468 is hereby incorporated by reference in its entirety.

Galloway, et al., U.S. Pat. No. 7,163,470 is hereby incorporated by reference in its entirety.

Williams, et al., U.S. Pat. No. 7,166,038 is hereby incorporated by reference in its entirety.

Desmukh U.S. Pat. No. 7,214,143 is hereby incorporated by reference in its entirety.

Murphy, et al., U.S. Pat. No. 7,252,600 is hereby incorporated by reference in its entirety.

Gibbs, et al., U.S. Pat. No. 7,258,626 is hereby incorporated by reference in its entirety.

Galloway, et al., U.S. Pat. No. 7,258,631 is hereby incorporated by reference in its entirety.

Evans, et al., U.S. Pat. No. 7,273,419 is hereby incorporated by reference in its entirety.

Hocknell, et al., U.S. Pat. No. 7,413,250 is hereby incorporated by reference in its entirety.

The measurements may be inputted into an impact code such as the rigid body code disclosed in U.S. Pat. No. 6,821,209, entitled Method for Predicting a Golfer's Ball Striking Performance, which is hereby incorporated by reference in its entirety.

The swing properties are preferably determined using an acquisition system such as disclosed in U.S. Pat. No. 6,431,990, entitled System and Method for Measuring a Golfer's Ball Striking Parameters, assigned to Callaway Golf Company, the assignee of the present application, and hereby incorporated by reference in its entirety. However, those skilled in the pertinent art will recognize that other acquisition systems may be used to determine the swing properties.

Other methods that are useful in obtaining a golfer's swing characteristics are disclosed in U.S. Pat. No. 6,638,175, for a Diagnostic Golf Club System, U.S. Pat. No. 6,402,634, for an Instrumented Golf Club System And Method Of Use, and U.S. Pat. No. 6,224,493, for an Instrumented Golf Club System And Method Of Use, all of which are assigned to Callaway Golf Company, the assignee of the present application, and all of which are hereby incorporated by reference in their entireties.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method for predicting a golfer's swing speed, the method comprising:
   a microprocessor configured to receive data from an accelerometer, the microprocessor configured to:
   determine that a golfer is addressing a golf ball to swing a golf club, the golf club comprising a device attached to a grip of the golf club, the device comprising the accelerometer and a radiofrequency transceiver, the device having a main body with a diameter ranging from 20 to 25 mm and a projection body having a length ranging from 1 to 5 mm;
   monitor a backswing of the golfer utilizing the accelerometer at a rate of at least 1 kilo-Hertz;
   determine a transition time from a backswing to a downswing of the golfer utilizing the accelerometer at a rate of at least 1 kilo-Hertz;
   monitor the downswing of the golfer utilizing the accelerometer at a rate of at least 1 kilo-Hertz;
   determine an impact time of the golf club with the golf ball utilizing the accelerometer at a rate of at least 1 kilo-Hertz;
   transmit data for the golfer's swing to a receiver for analysis, the data comprising the transition time and the impact time; and
   generate a golfer's swing speed using a length of a shaft of the golf club, the transition time and the impact time, wherein the device is in continuous operation between at least a sleep mode, a monitoring mode and a transmission mode, wherein the device consumes less than 600 nano-amps of power in the sleep mode, wherein the device consumes less 200 micro-amps of power during the monitoring mode, and wherein the device consumes less than 12 milli-amps of power during the transmission mode.

2. The method according to claim 1 wherein transmitting the data comprises transmitting data on the golfer's swing in a single transmission.

3. The method according to claim 1 wherein transmitting the data comprises transmitting data in a plurality of transmissions.

4. The method according to claim 1 wherein the receiver is a GPS device, Smart Phone, PDA, or computer.

5. The method according to claim 1 wherein the data for a golfer's swing is transmitted at a radiofrequency of 2.4 giga-Hertz utilizing the radiofrequency transceiver of the device.

6. The method according to claim 1 wherein the device further comprises a battery.

7. The method according to claim 1 wherein the accelerometer is a multiple axis accelerometer.

8. A system for predicting a golfer's swing speed, the system comprising:
   a golf club comprising a club head, a shaft, a grip and a device attached to the grip, the device having a main body with a diameter ranging from 20 to 25 mm and a projection body having a length ranging from 1 to 5 mm, the device comprising a microprocessor, an accelerometer and a radiofrequency transceiver, the microprocessor configured to:
   receive data from the accelerometer at a rate of at least 1 kilo-Hertz;
   determine that a golfer is addressing a golf ball to swing a golf club;
   monitor a backswing of the golfer;
   determine a transition time from a backswing to a downswing of the golfer;
   monitor the downswing of the golfer;
   determine an impact time of the golf club with the golf ball; and
   transmit data for the golfer's swing, the data comprising the transition time and the impact time; and
   a receiver comprising a microprocessor and a transceiver, the transceiver operating on a first communication protocol, the microprocessor configured to generate a golfer's swing speed using a length of a shaft of the golf club, the transition time and the impact time, wherein the device is in continuous operation between at least a sleep mode, a monitoring mode and a transmission mode, wherein the device consumes less than 600 nano-amps of power in the sleep mode, wherein the device consumes less 200 micro-amps of power during the monitoring mode, and wherein the device consumes less than 12 milli-amps of power during the transmission mode.

9. The system according to claim 8 wherein the microprocessor is configured to transmit the data on the golfer's swing in a single transmission.

10. The system according to claim 8 wherein the microprocessor is configured to transmit the data in a plurality of transmissions.

11. The system according to claim 8 wherein the receiver is a GPS device, Smart Phone, PDA, or computer.

12. The system according to claim 8 wherein the data for a golfer's swing is transmitted at a radiofrequency of 2.4 giga-Hertz utilizing the radiofrequency transceiver of the device.

13. The system according to claim 8 wherein the device further comprises a battery.

14. The system according to claim 8 wherein the accelerometer is a multiple axis accelerometer.

* * * * *